United States Patent [19]

Vecchiotti

[11] 4,125,187
[45] Nov. 14, 1978

[54] THERMOPLASTIC CASING AND METHOD OF MANUFACTURING SAME

[75] Inventor: Camillo M. Vecchiotti, Ridgewood, N.J.

[73] Assignee: Amerace Corporation, New York, N.Y.

[21] Appl. No.: 516,420

[22] Filed: Oct. 21, 1974

[51] Int. Cl.² .............................................. B65D 85/30
[52] U.S. Cl. .................................... 206/333; 206/521; 206/819; 206/524.6; 220/8; 220/71
[58] Field of Search ........................ 220/72, 90, 71, 74, 220/8; 136/166; 206/819, 333, 2, 451, 521

[56] References Cited

U.S. PATENT DOCUMENTS

| 1,014,524 | 1/1912 | Sabourin | 229/5.7 |
| 3,147,151 | 9/1964 | Toce | 136/166 |
| 3,167,458 | 1/1965 | Brazell | 136/166 |
| 3,215,307 | 11/1965 | Connell | 220/72 |
| 3,362,576 | 1/1968 | Beesley et al. | 220/72 |
| 3,558,001 | 1/1971 | Fritz | 220/72 |
| 3,816,181 | 6/1974 | Buckethal | 136/166 |
| 3,901,406 | 8/1975 | Kivett | 220/4 B |

OTHER PUBLICATIONS

Condensed Chemical Dictionary, p. 705 (1971).

Primary Examiner—William Price
Assistant Examiner—Bruce H. Bernstein
Attorney, Agent, or Firm—S. Michael Bender; Ken Richardson

[57] ABSTRACT

A casing formed by a hollow enclosure molded integral from a polycarbonate material, with at least a portion of the enclosure having a sinusoidal, cross-sectional configuration. A method of manufacturing a casing of the above type.

2 Claims, 4 Drawing Figures

THERMOPLASTIC CASING AND METHOD OF MANUFACTURING SAME

BACKGROUND OF THE INVENTION

This invention relates to a hollow casing formed of plastic material and a method for manufacturing such a casing. More particularly, the present invention relates to such a casing and method in which the casing is molded from a polycarbonate material with its wall having a continuous, sinusoidal, cross-sectional configuration.

Traditionally, casings manufactured for use in industrial applications such as, for example, containers for large storage batteries, have been formed of a thermoset or vulcanized material, such as hard rubber. While such composition normally has the desired chemical and load resistant properties required, it is quite heavy, is not flame resistant, and has poor impact resistance. Also, the costs of hard rubber have been gradually increasing until the use of plastics has lately become a possible alternative.

However, the use of plastics in forming casings or other similar structures is not without problems. For example, in the manufacture of relatively large casings, the use of polyethylenes has been proven unsatisfactory since they lack the proper strength properties to accommodate the high mechanical stresses that are often placed on the casing. Also, thermoplastic polyesters, while having adequate mechanical strength, are often susceptible to attack by chemicals and, in addition, are often too costly to be economically feasible.

Of course, it is possible to produce a laminated structure of two plastic materials, one for supplying the required mechanical strength and the other having a proper resistivity to attack by chemicals. However, it can be appreciated that the requirement for two plastic materials increases the costs of materials and labor, often to unacceptable levels.

SUMMARY OF THE INVENTION

It is, therefore, an object of the present invention to provide a casing that can be produced from a single thermoplastic material, yet retain the proper strength and chemical resistive characteristics required for industrial use.

It is a further object of the present invention to provide a casing of the above type which is relatively low in cost and relatively easy to manufacture.

It is a further object of the present invention to provide a method for manufacturing a plastic casing of the above type.

Toward the fulfillment of these and other objects, the casing of the present invention is formed by a hollow enclosure molded integral from a polycarbonate material and having an access opening, at least a portion of said enclosure having a sinusoidal cross-sectional configuration.

DESCRIPTION OF THE PREFERRED EMBODIMENTS

Figure 1:
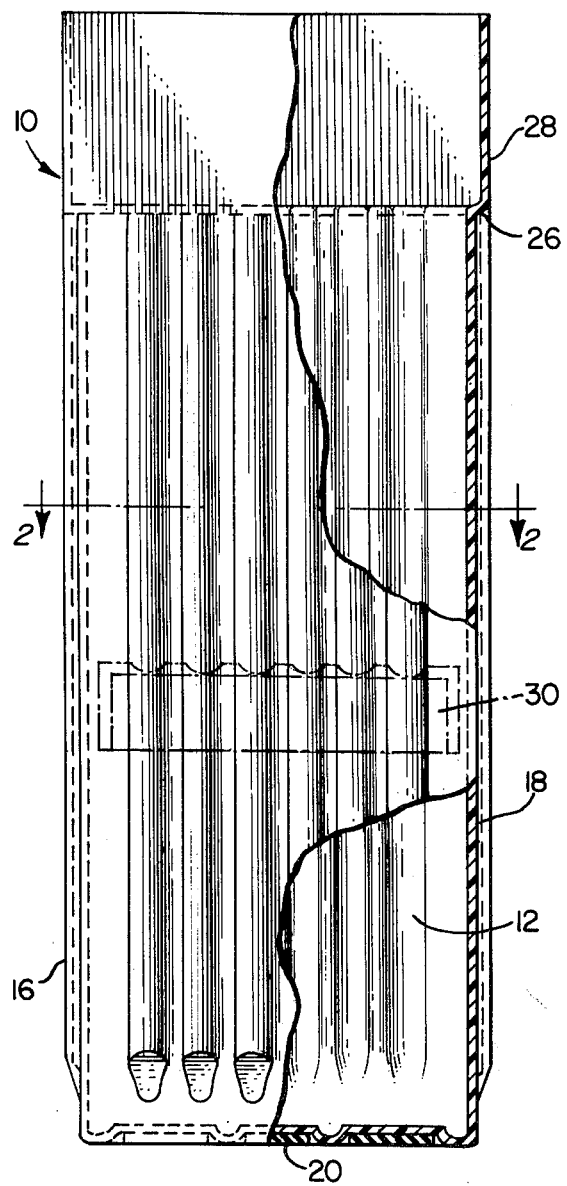
FIG. 1 is a partial front elevational, partial sectional view of the battery casing of the present invention.

The present invention is a result of applicant's discovery that a casing produced from a polycarbonate that is rotationally molded into a particular configuration possesses adequate strength characteristics and resistance to attack by chemicals, yet is relatively simple and inexpensive to manufacture.

An example of this type casing is shown in FIGS. 1–4 in the form of a casing for a relatively large storage battery, and includes an open-ended enclosure, shown in general by the reference numeral 10. The enclosure 10 is formed by front and rear walls 12 and 14, respectively, and side walls 16 and 18 all molded integral with, and extending perpendicular to, a base 20. The base 20 is reinforced with a central circular rib 22 and four diagonal ribs 24 as better shown in FIGS. 2 and 4.

Each wall 12, 14, 16 and 18 has a stepped, or shoulder, portion 26 near the open end of the enclosure 10 to form an enlarged mouth portion 28 for the purpose of increasing the volume of the enclosure, and to enable the casing to be supported or lifted by engaging the shoulder portions. Although not shown in the drawings, it is understood that, in normal use, a cover would be provided over the open end of the enclosure 10.

Figure 3:
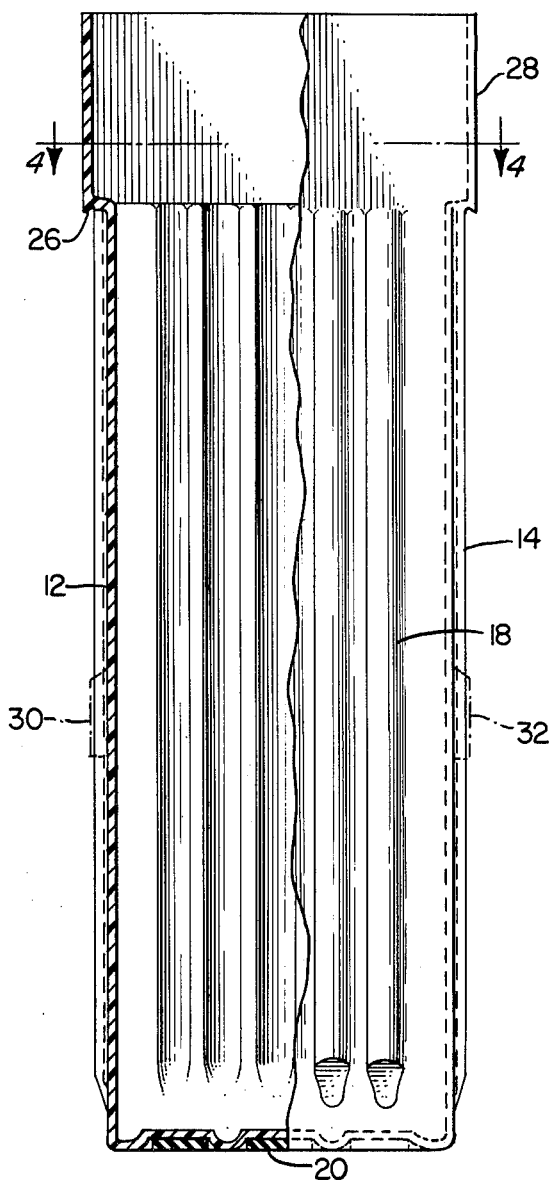
FIG. 3 is a partial side elevational, partial sectional view of the casing of FIG. 1.
Figure 2:
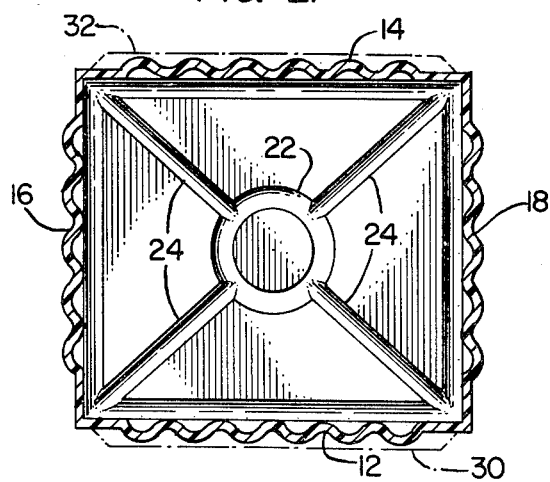
FIG. 2 is a cross-sectional view taken along the line 2—2 of FIG. 1.
Figure 4:
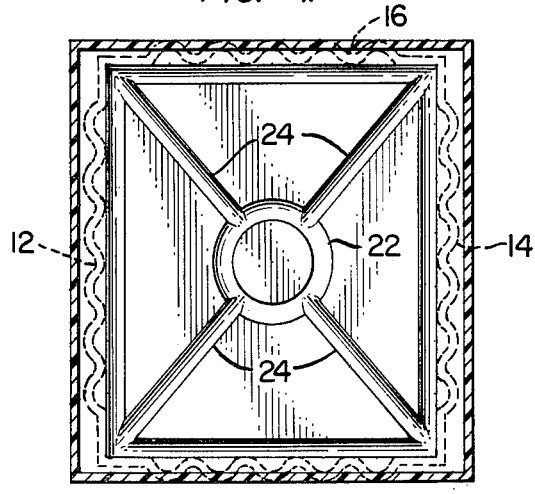
FIG. 4 is a cross-sectional view taken along the line 4—4 of FIG. 3.

According to a feature of the present invention, the cross-section of each of the walls 12, 14, 16 and 18 in a horizontal plane as viewed in FIGS. 1 and 3, and as shown in FIGS. 2 and 4, is of a sinusoidal shape extending for substantially the entire width of each wall. For the purposes of this application, it is understood that the term sinusoidal refers to a continuous curve having equal amplitudes of variation in alternating directions from a center line, thus forming a configuration identical in shape to a sine wave, as is well-known in electronic terminology.

As noted from FIGS. 1 and 3, the sinusoidal cross-sectional configuration extends for a substantial portion of the length of each wall 12, 14, 16 and 18, from a point adjacent the base 20 to the enlarged mouth portion 28.

The reference numerals 30 and 32 refer to a pair of reinforcing strips which are attached to the walls 12 and 14, respectively, and which are shown in dot-dashed lines since they form an optional feature of the present invention. The specific details of the strips 30 and 32 will be described later.

The casing of the present invention is manufactured by rotationally molding a polycarbonate material. According to the method of manufacture, the polycarbonate material, in powder form, is placed in an open mold, the walls of which have a configuration corresponding to the sinusoidal shape discussed above in connection with the walls 12, 14, 16 and 18 of the casing. The polycarbonate material is heated to a temperature above its melting temperature and the mold is rotated about two axes to deposit a layer of the melted polycarbonate material on the wall surfaces and the bottom of the mold. The mold and material are allowed to cool while rotating, and the material is then stripped from the mold in the basic form of the casing shown in FIGS. 1–4. Since the basic rotational molding technique is conventional, it will not be described in any further detail.

It has been discovered that, with polycarbonate being used as the material and the walls 12, 14, 16 and 18 configured in the sinusoidal form shown, the resulting casing has strength characteristics and resistance to acidity compatible with use as a relatively large leadstorage battery casing or other similar uses, while eliminating the disadvantages set forth above with respect to the use of hard rubber or other plastic materials.

EXAMPLE 65 pounds of finely divided LEXAN RP-701, a roto-molding grade of polycarbonate marketed by the General Electric Company, is pre-dried in an air circulating oven at 250° F. for at least 2 hours in shallow trays not over 2 inches deep. The dried polycarbonate is then molded in the heating oven of a conventional three spindle roto-cast machine (McNeil) at a temperature of 650° F. for 28 minutes. Rotation of the spindle of the machine is set at 5 rpm and 6 rpm, respectively, on the major and minor axes to produce a 5:1 ratio of the vertical to horizontal axis rotation. At the end of the oven cycle, the mold is indexed to the cooling chamber of the same machine while rotating on both axes. Cooling is accomplished by a sequence of forced air for 23 minutes, followed by 5 minutes of water fog spray, and again by 1 minute of forced air. After cooling, the mold is indexed to the unload position of the machine at which time the mold is opened and the molded part removed therefrom.

The resulting casing, with overall dimensions of about 19¾ × 177/16, × 52⅛ inches high, and having an average wall thickness of 3/8 inch in all respects matches the industry specifications for battery casings of this type, while other casings of the same wall thickness and constructed of other plastic materials or having different wall configurations, including those having ribs, or the like, projecting from one surface of the walls, lack the structural strength required for these specifications.

As stated above, the strips 30 and 32 may be affixed to the outer surfaces of the walls 12 and 14, respectively, to provide added strength to the casing. The strips 30 and 32 extend for substantially the entire width of their respective walls 12 and 14, and have a tapered, or beveled, cross-section. A plurality of grooves are formed in the inner surfaces of the strips 30 and 32 to receive the projecting portions of the walls 12 and 14, respectively. The strips 30 and 32 are molded from a fiberglass reinforced polyester material with very high flexural modulus properties and are affixed to the walls 12 and 14, respectively, by adhesive, or the like.

In addition to increasing the strength characteristics of the casing 10, as discussed above, the use of the strips 30 and 32 makes it possible to decrease the cost of the casing while maintaining its strength characteristics. For example, by including the strips 30 and 32, the casing described in connection with the above example can be manufactured with walls having an average thickness of 5/16 inch, yet will match the industry specifications. As a result, the weight of the initial charge of finely divided polycarbonate can be reduced to 55 pounds thereby reducing the material costs considerably.

It is understood that several variations may be made in the casing of the present invention without departing from the scope of the invention. For example, the particular shape of the casing and the location of the reinforcing bands may be varied. Still other variations of the specific construction and arrangement of the casing and method disclosed above can be made by those skilled in the art without departing from the invention as defined in the appended claims.

I claim:

1. A battery casing comprising a hollow, acid resistant enclosure molded integral from a polycarbonate material, said enclosure including a base, a plurality of side walls extending from said base and an access opening disposed remotely from said base, at least a portion of each of said side walls having a sinusoidal cross-sectional configuration as defined by the intersection of said portion with a plane passing through said portion substantially parallel to said base, said portion being spaced proximately from said base and extending toward said opening, said enclosure further including a reinforcing strip affixed to a surface of at least one of said side wall portions wherein said reinforcing strip includes a plurality of grooves on the inner surface of said strip, said grooves being complementary to the sinusoidal configuration of said surface of at least one of said side wall portions whereby said reinforcing strip enables the wall thickness of said portion to be less than it otherwise would be in order to substantially maintain said side wall portion in its original configuration.

2. A battery casing comprising a hollow, acid resistant enclosure molded integral from a polycarbonate material, said enclosure including a base, a plurality of side walls extending from said base and an access opening disposed remotely from said base, said side walls extending substantially perpendicular to each other and to said base respectively, at least a portion of each of said side walls having a sinusoidal cross-sectional configuration forming a plurality of corrugations in said side walls extending between said base and said access opening substantially perpendicular to said base, the wall thickness of said side wall portions being sufficient to substantially maintain the original sinusoidal configuration of said side wall portion when said casing is filled with an electrolyte; and wherein at least a pair of reinforcing strips are affixed to a surface of a pair of opposed walls of said casing respectively, each of said reinforcing strips including a plurality of grooves in one side thereof, said grooves being complementary to said corrugations.

* * * * *